United States Patent [19] [11] 4,136,304
Baechler et al. [45] Jan. 23, 1979

[54] CONTROL DEVICE FOR A BRAKING MECHANISM USING AN ENERGY-STORING SPRING

[75] Inventors: Urs Baechler, Effretikon; Pierre Riondel, Genf, both of Switzerland

[73] Assignee: Brown, Boveri & Co. Ltd., Baden, Switzerland

[21] Appl. No.: 688,095

[22] Filed: May 18, 1976

[30] Foreign Application Priority Data

May 30, 1975 [CH] Switzerland .................... 6985/75

[51] Int. Cl.² ............................................. H02K 7/10
[52] U.S. Cl. ................................. 318/372; 185/40 R; 185/44; 188/162; 188/171
[58] Field of Search ............... 185/40 R, 44; 290/1 E; 188/162, 163, 171, 173; 303/3; 318/372

[56] References Cited

U.S. PATENT DOCUMENTS

| | | | |
|---|---|---|---|
| 2,693,254 | 11/1954 | Barish | 188/171 |
| 3,092,742 | 6/1963 | Smith et al. | 318/372 X |
| 3,659,683 | 5/1972 | Betzing | 188/162 |
| 3,761,790 | 9/1973 | Daab | 318/467 |

FOREIGN PATENT DOCUMENTS 1,442,652 7/1976 United Kingdom ..................... 188/171

Primary Examiner—James R. Scott
Assistant Examiner—John J. Feldhaus
Attorney, Agent, or Firm—Toren, McGeady and Stanger

[57] ABSTRACT

A control system for use with a braking mechanism which employs an energy-storing spring and an electric rotating servomotor is disclosed. The system operates employing a direct or indirect measurement of the stored braking force. When an indirect approach is used, a pair of selsyns supply a measured rotational parameter which is related to braking force. After suitable processing, which includes the use of a discriminator and counter, a parameter relating to the stored braking force is compared with a desired value at a summing point to provide a correction parameter for braking control. When direct braking force measurement is used, the measured braking force is supplied directly to a summing point for comparison with a desired value. In both direct and indirect measurement, a differentiator is included which supplies the derivative of the measured value to the summing point. The output of the summing point is a correction parameter which operates triggering devices for brake actuation and release. These devices in turn control the motor and a brake control winding in the braking mechanism.

14 Claims, 3 Drawing Figures

CONTROL DEVICE FOR A BRAKING MECHANISM USING AN ENGERGY-STORING SPRING

FIELD OF THE INVENTION

The present invention relates to a control system for a braking mechanism employing an energy-storing spring having an electric rotatable servomotor and a spindle rod movable in translation.

BACKGROUND OF THE INVENTION

Control devices for braking mechanisms using energy-storing springs are already known. It is the task of the braking mechanisms using energy-storing springs, among others, to actuate the brake, upon failure of the electrical devices, i.e., upon current failure for any reason whatever without the supply of any external energy. A braking mechanism using an energy-storing spring of this type is described and illustrated in the brochure of the "RACO G.m.b.H. Schwelm," August 1970.

The construction of a braking mechanism using an energy-storing spring includes two basic structural parts — the energy-storing spring and the electric drive therefor. The rotating motion of the motor is changed to a translatory motion of a spindle rod through a ball-type spindle with an associated nut disposed in the hollow shaft of the armature. The kinetic energy of the motor is thus transferred to the energy-storing spring. An electromagnetic brake is flange-mounted on the rear end of the braking device, which maintains the energy state of the stressed energy-storing spring with the least expenditure of energy upon the brake being released. The energy supply to the electromagnetic brake is interrupted via a magnetic contactor for braking of the vehicle. The energy-storing spring is then relaxed and is able to rotate the motor freely through the installed mechanism.

If the free stroke of the spindle has been covered, then the energy-storing spring has reached the force of the initial stress corresponding to the lowest braking force. The braking force is changed during the path of the stroke according to the spring characteristics of the energy-storing spring. The motor of the braking mechanism is switched "ON" through a second magnetic actuator for the release of the brake of the vehicle. The translatory motion of the spindle stresses the energy-storing spring, and towards the end of the stroke path, an installed switch switches the motor magnetic contactor "OFF," and switches the magnetic contactor of the electromagnetic brake "ON." The energy-storing spring is then again ready for braking.

In another brochure of the "RACO G.m.b.H. Schwelm," August 1972, another construction of the braking mechanism having an energy-storing spring is described and illustrated. The implementation described above has been expanded by a self-actuating and adjusting device and by a manually releasable device. This version is provided with a switch for braking stages, which contains resistors for the braking stages and is controlled dependent on weight or velocity. This control of the braking force by means of the resistors, does not, however, permit an unambiguous and reproducible relation with respect to the braking force, which is independent of any fluctuations of the control voltage and power supply, as well as of the direction of rotation. Additionally, the demand for electric energy is considerable in the intermediate stages.

OBJECTS OF THE INVENTION

It is the general object of the present invention to provide a control system for a braking mechanism having an energy-storing spring in conjunction with an electric rotatable servomotor, which obviates the disadvantages of known arrangements, permits an adequately smooth control of the braking force and includes a criterion having an unambiguous relation with respect to the braking force.

It is also an object of the present invention to provide a control system for a braking mechanism having an energy-storing spring and an electric rotatable servomotor with a minimum demand on external energy by the system.

It is a further object of the present invention to provide a control system for a braking mechanism having an energy-storing spring wherein the system control is provided by direct or indirect measurement of braking force, thereby allowing economical implementation of the system.

It is still a further object of the present invention to provide a control system for a braking mechanism having an energy-storing spring wherein the measurement means for the controlling parameter of the system is effected by a contactless device.

SUMMARY OF THE INVENTION

According to the present invention, in a control system for a braking mechanism of the type wherein the braking mechanism employs an energy-storing spring, an electric rotatable servomotor and a translationally movable spindle rod, the improvement comprises means for measuring a parameter related to the stored braking force of the braking mechanism.

The parameter measuring means effects either direct or indirect measurement of the stored braking force.

For better understanding of the present invention together with other and further objects thereof, reference is made to the following description and accompanying drawings while the scope of the invention is pointed out in the appended claims.

IN THE DRAWINGS

Referring to FIG. 1, FIG. 1 shows a longitudinal section through a braking device having an energy-storing spring, known per se, with installed inductive selsyns of a control device according to the invention;

FIG. 2 illustrates a block diagram of one embodiment of the control system of the present invention; and FIG. 3 shows a second embodiment in block form of the control system of the present invention.

DETAILED DESCRIPTION OF THE INVENTION

Figure 1:
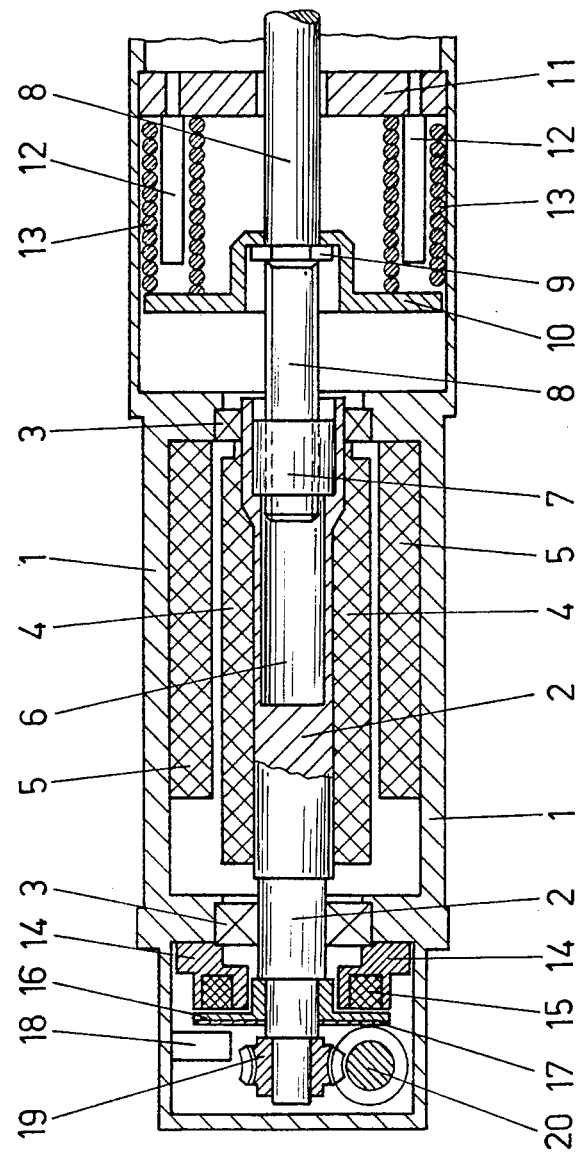

Referring initially to FIG. 1, a housing is denoted by the reference numeral 1, a shaft of a servomotor by the numeral 2, a support of the shaft 2 by the numeral 3, a rotor of the servomotor by the numeral 4, and a stator thereof by the numeral 5. A bore in the shaft 2 is denoted by the reference numeral 6, a ball-bearing sleeve is denoted by the reference numeral 7, a spindle rod by the reference numeral 8, a nut by the reference numeral 9, and a movable plate by the reference numeral 10. A base plate is denoted by the reference numeral 11, guide pins or rods are denoted by the reference numerals 12, compression springs by the reference numerals 13, an electromagnetic stopping brake by the reference numeral 14, a winding of the electromagnetic stopping brake 14 by the reference numeral 15, and a braking disc by the reference numeral 16. The reference numeral 17 denotes a selsyn disc, the numeral 18 inductive selsyns, the numeral 19 a worm gear and the numeral 20 a manually releasable device or mechanism. The reference numerals of FIG. 1 also apply to corresponding parts or components of FIGS. 2 and 3.

Figure 2:
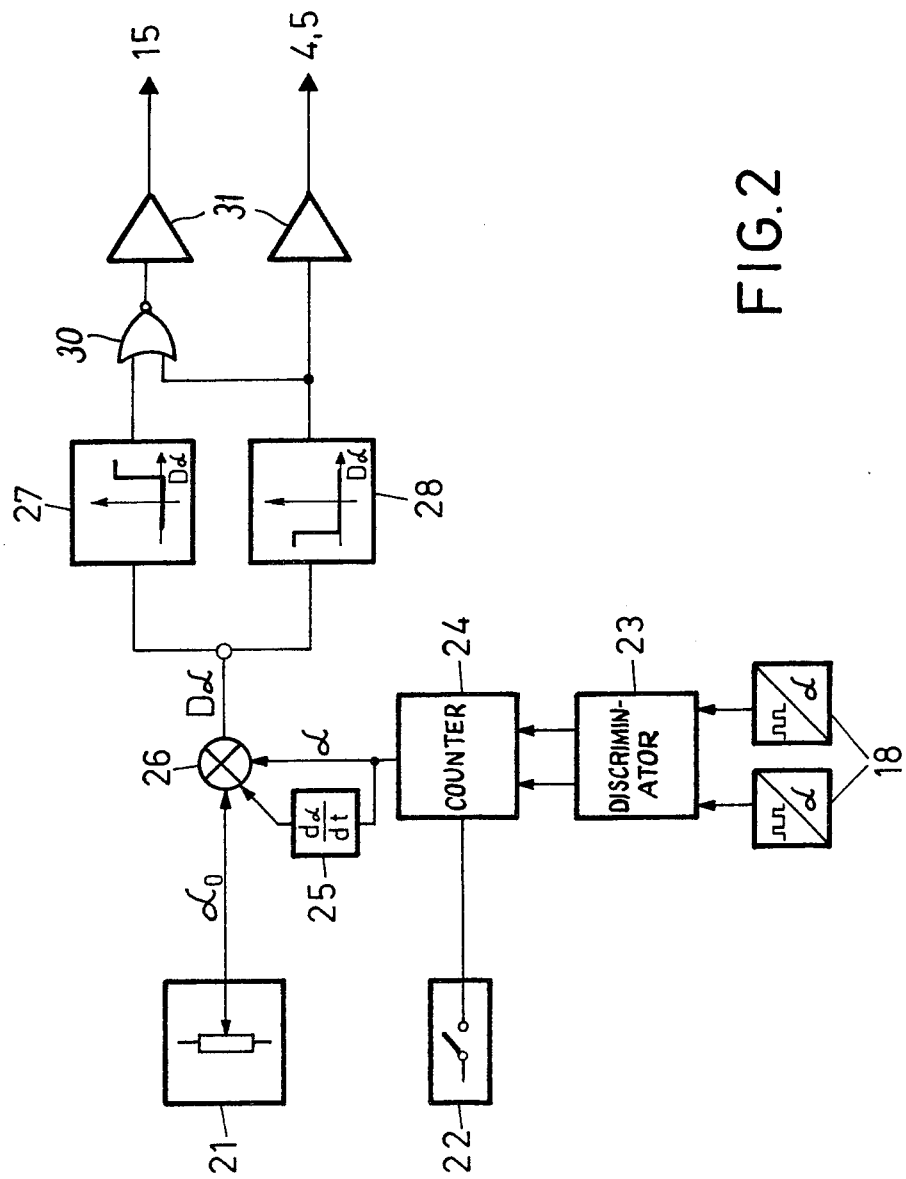
Figure 3:
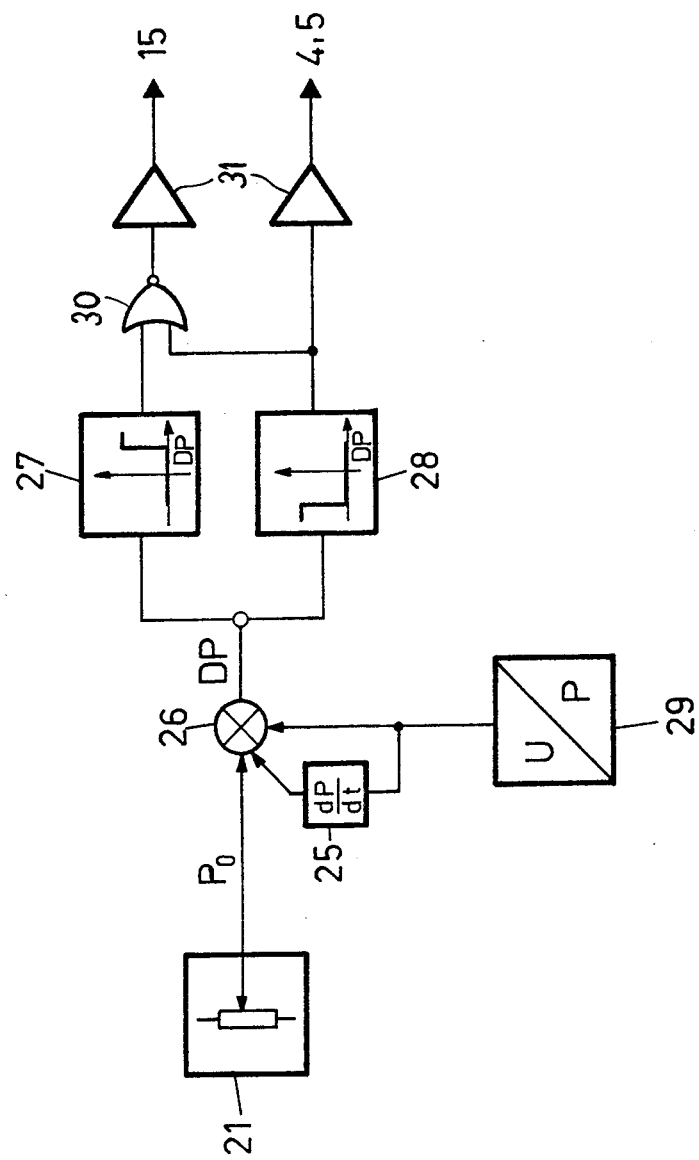

In FIG. 2, an indicator of the desired value or parameter has the reference numeral 21, a terminal switch the reference numeral 22, a discriminator the reference numeral 23 and a counter the reference numeral 24. A derivative element or differentiator is indicated by the reference numeral 25, a summing arrangement by the numeral 26, a triggering device for braking by the numeral 27, and a triggering device for release of the brake by the numeral 28. In FIG. 3, corresponding parts are denoted by the same reference numerals as in FIG. 2. The numeral 29 denotes a device for measuring forces.

The shaft 2 of the servomotor is, according to FIG. 1, supported in the supports 3 of the housing 1. The rotor 4 and the stator 5 of the servomotor are shown only schematically. The ball-bearing sleeve 7 is attached to the shaft 2 in the bore 6, the rotating motion thereof being changed into a translatory motion of the spindle rod 8. The movable plate 10 is connected to the spindle rod 8 by means of the nut 9. Compression springs 13 are disposed between the movable plate 10 and the base plate 11, the springs 13 being maintained in the axial position by the guide pins 12. The electromagnetic stopping brake 14 is provided with the winding 15. The shaft 2 is connected to the disc brake 16, the latter carrying on its other side the selsyn disc 17. The two inductive selsyns 18 are disposed behind each other in a radial plane. The manually releasable device 20 is connected in the coupled state thereof to the shaft 2 by means of the worm gear 19.

The functional operation of the mechanical parts of the braking device having an energy-storing spring is identical to the one described initially. On the exterior side of the braking disc 16 there is, however, disposed the selsyn disc 17 which is, for example, provided with eight metal laminations; this permits an adequately precise indirect determination of the braking force, since the braking force corresponds to the position of the spindle rod 8, and that position to the angular position of the rotor 4 and the shaft 2. The arrangement of two inductive selsyns 18 also permits the determination of the direction of the rotational motion.

FIG. 2 shows, for example, a circuit diagram with two inductive selsyns 18. The desired parameter or value $\alpha_o$ is adjusted by means of the desired value indicator 21. Means for measuring a parameter related to the braking force of the braking mechanism is provided by the inductive selsyns or indicators 18, which determine the measured value $\alpha$. The discriminator 23 serves for the determination of the direction of rotation, and a counter 24 for the determination of the angular position. The terminal switch 22, not illustrated in FIG. 1, determines when the extreme position of the movable plate 10 has been reached. The derivative element or differentiator 25 serves for technical control purposes.

The desired value $\alpha_o$, the measured value $\alpha$ and the derived value $d\alpha/dt$ are summed up in the summing device 26 which provides a correction parameter $D\alpha$. The triggering member 27 for operating, or the triggering member 28 for release of the brake, then switch the electromagnetic stopping brake 15 or the servomotor 4 or 5 in and out, respectively. The circuit diagram according to FIG. 3 functions in a similar manner. It concerns the direct determination of the braking force P. The desired value $P_o$ of the braking force is indicated by the desired value indicator 21, the measuring value by P, and the force-measuring member by 29. The force-measuring member 29 may either be incorporated into the brake mechanism of the energy-storing spring and the motor or may be incorporated external thereto.

A typical direct braking force measuring device which may be used is a piezoelectric transducer well known in the art which may be incorporated in the spindle rod 8.

Element 30 in FIGS. 2 and 3 is an AND gate and elements 31 are amplifying elements for processing the controlling signals.

It has been shown that the objects of the invention have been met by the provision of a control arrangement for the aforesaid type of braking mechanism containing means for the direct or indirect determination of the braking force. A major advantage of the invention is that in the aforementioned arrangement, a stepless control is permitted, or a control with an arbitrary number of smoothly separated stages. This allows a precise and unambiguous reproducible adjustment of the predetermined braking force with the least demand of any external energy through the direct or indirect determination of the braking force as an actual value of the control.

It is further advantageous, as has been shown, if the means for a direct determination of the braking force consist of means for determining the angular position of the rotor of the servomotor. This version can be seen to have the advantage in providing a solution permitting a very economical implementation of the brake force determination. It is also advantageous if the means for the determination of the angular position of the servomotor's rotor contain at least one inductive selsyn or indicator, since this permits an absolutely contactless measurement not subject to any mechanical wear. According to a further implementation, the means for an indirect determination of the braking force includes means for direct and indirect determination of the position of the spindle rod movable in a translatory manner. It is further advantageous if the means for direct or indirect determination of the position of the spindle rod movable in a translatory manner contain at least one potentiometer. This implementation permits the employment of very simple means for such a determination. According to a further implementation, the means for direct determination of the braking force consist of force-measuring elements, which are installed in a part of the braking mechanism having an energy-storing spring serving for the transmission of the braking force. The advantage of this implementation manner results in the most precise control, since any age- or maintenance-related changes in the behavior of the device do not affect the controlled braking force.

It is particularly advantageous if at least one inductive selsyn or indicator, and one indicator of the desired value is connected to a summing arrangement, a counter being disposed between the inductive selsyn or indicator and the summing device, and if triggering members are disposed following the summing device for the servomotor and for its stopping brake. It is then advisable that the control mechanism contain two inductive selsyns or indicators connected to a discriminator. According to another implementation version, a device for measuring the braking force and an indicator for the desired value are connected to a summing device, triggering devices being disposed following the summing device for the servomotor and for a stopping brake. It is then advantageous if the control device contains a derivative element or differentiator. The above arrangements permit a simple and appropriate solution corresponding to the requirements of the control problem.

While the invention has been particularly shown and described with reference to the preferred embodiments thereof, it will be understood by those skilled in the art that various modifications and changes in form and detail may be made therein without departing from the true spirit and scope of the present invention.

What is claimed is:

1. In a control system for a braking mechanism of the type wherein the braking mechanism employs an energy-storing spring, an electric rotatable servomotor and a translationally movable spindle rod, the improvement comprising:
means for measuring a parameter related to the stored braking force of said braking mechanism and wherein the servomotor includes a rotor and said stored braking force parameter measuring means includes means for determining the angular position of the servomotor rotor.

2. The control system of claim 1 wherein said rotor angular position determining means includes at least one inductive selsyn.

3. The control system of claim 1 wherein the stored braking force parameter measuring means includes means for determining the position of the translationally movable spindle rod.

4. The control system of claim 3 wherein the spindle rod position determining means includes at least one potentiometer.

5. The control system of claim 1 wherein said stored braking force parameter measuring means includes a pair of inductive selsyns, said selsyns cooperating with a braking element of said braking mechanism and a discriminator responsive to said selsyns for determining the direction of rotation.

6. The control system of claim 5 wherein the outputs of said selsyns are in pulse form and a counter is included which is responsive to said discriminator, the output of said counter being supplied to comparing means for comparing said parameter with a desired parameter to produce a correction parameter, and means responsive to the correction parameter to control said breaking mechanism.

7. The control system of claim 6 wherein said comparing means is an algebraic summing point and a differentiator is included which is responsive to the counter output, the output of said discriminator also being supplied to said summing point.

8. The control system of claim 6 also including a triggering device for effecting braking and a triggering device for releasing braking, both said devices responsive to said correction parameter.

9. The control system of claim 5 wherein said braking mechanism is provided with a control winding, said winding being responsive to the operation of said triggering devices.

10. The control system of claim 6 wherein said rotor and stator of said servomotor are responsive to the operation of said triggering brake release device.

11. In a control system for a braking mechanism of the type wherein the braking mechanism employs an energy-storing spring, an electric rotatable servomotor and a translationally movable spindle rod, the improvement comprising:
means for measuring a parameter related to the stored braking force of said braking mechanism, wherein said measured parameter is compared with a desired braking force at an algebraic summing point, which point is responsive to the desired braking force, to produce a correction force for controlling the braking mechanism.

12. The control system of claim 11 wherein a differentiator is included which is responsive to the measured braking force, the output of said differentiator being supplied to said summing point.

13. The control system of claim 11 wherein the stored braking force parameter measuring means is incorporated as part of the braking mechanism employing an energy-storing spring and which operates to transmit the braking force.

14. The control system of claim 11 wherein the stored braking force measuring means is incorporated in a part of the braking system external to the braking mechanism but responsive thereto.

* * * * *